United States Patent [19]
Cochran et al.

[11] 3,762,127
[45] Oct. 2, 1973

[54] APPARATUS FOR MAKING SEED TAPE

[75] Inventors: Troy Lee Cochran; Melvin D. Kirkpatrick, both of Salinas, Calif.

[73] Assignee: Union Carbide Corporation, New York, N.Y.

[22] Filed: Sept. 7, 1971

[21] Appl. No.: 178,118

Related U.S. Application Data

[62] Division of Ser. No. 875,301, Nov. 10, 1969, Pat. No. 3,683,583.

[52] U.S. Cl. ................................................. 53/177
[51] Int. Cl. ............................................... B65b 9/06
[58] Field of Search ...................... 53/28, 177, 180; 93/82

[56] References Cited
UNITED STATES PATENTS

| | | | |
|---|---|---|---|
| 1,160,278 | 11/1915 | Gray et al. | 53/180 |
| 3,623,266 | 11/1971 | Nakayama | 53/180 X |
| 2,422,188 | 6/1947 | Epstein | 93/82 |
| 3,495,506 | 2/1970 | Plymale | 93/82 |
| 3,511,016 | 5/1970 | Craig | 53/108 X |
| 3,561,187 | 2/1971 | Rohnert et al. | 53/180 X |

*Primary Examiner*—Robert L. Spruill
*Attorney*—Owen, Wickersham & Erickson

[57] ABSTRACT

A single strip passes while under tension and with a portion moistened through a generally V-shaped mandrel channel with a rounded lower end, and seeds are dropped into place on the tape. Then the tape is guided along a gradually deepened channel with widened lower portion and through a pair of generally circular eyes, each having a step. These eyes form the tape into an overlapped circular shape. A pair of rollers then flatten the tape and seal it closed, while retaining the overlap.

5 Claims, 10 Drawing Figures

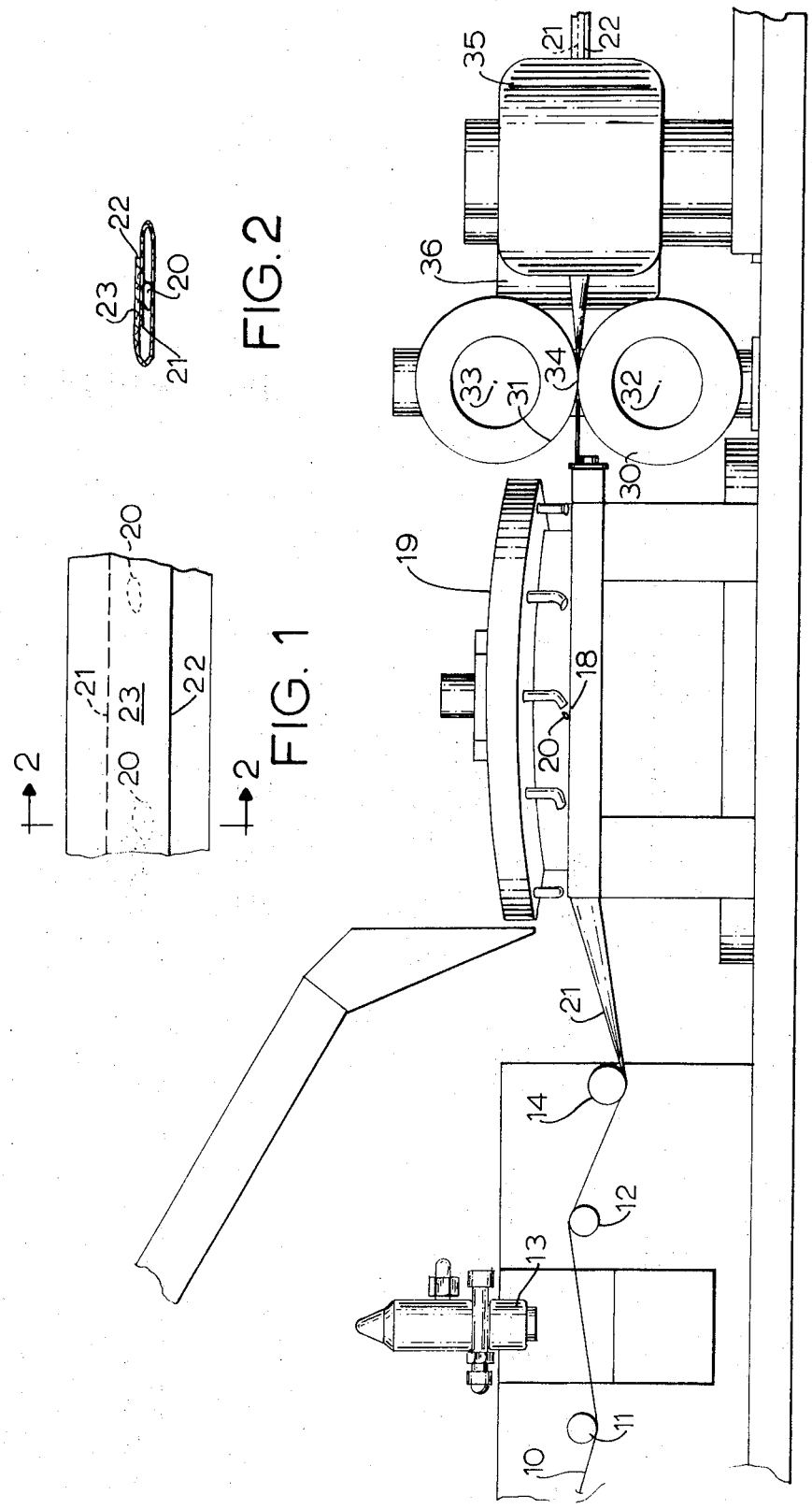

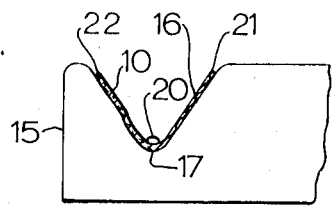
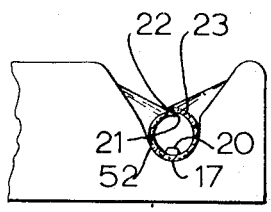
FIG. 5   FIG. 6
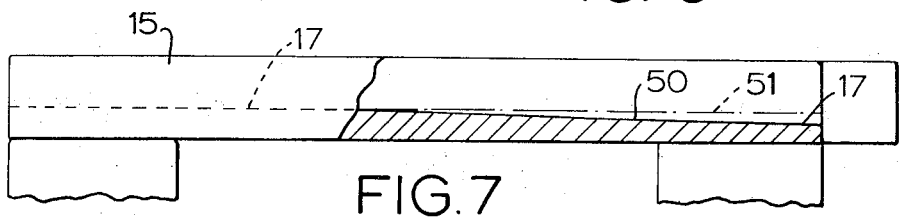
FIG. 7
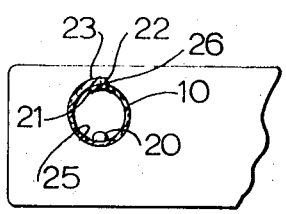
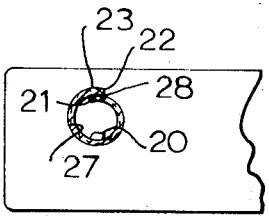
FIG. 8   FIG. 9
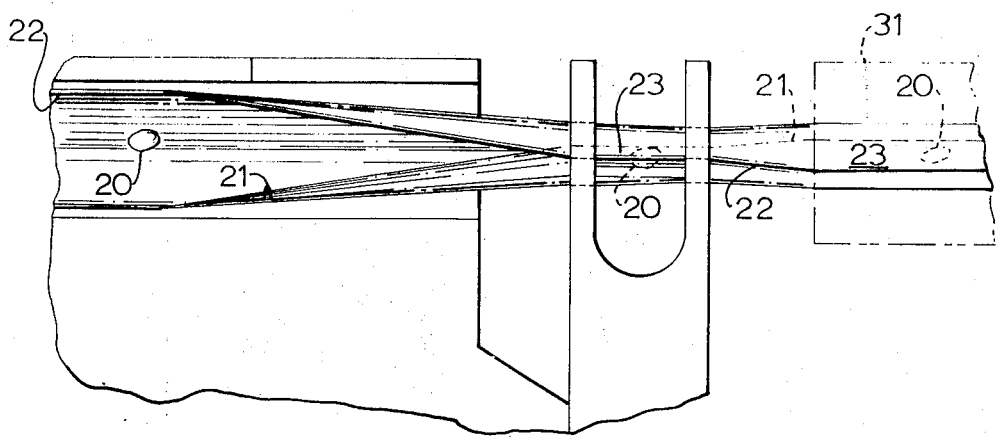
FIG. 10

APPARATUS FOR MAKING SEED TAPE

This is a division of application Ser. No. 875,301, filed Nov. 10, 1969, now U.S. Pat. 3,683,583.

This invention relates to apparatus for making seed tape.

Seed tape has recently been manufactured successfully from polyoxyethylene, and successful machines have been described in earlier-filed patent applications. However, a special problem arises with some relatively large seeds, for then it is not satisfactory merely to place the seeds individually in a vee-shaped configuration of tape and simply to close the moistened side edges of the tape together. Large seeds exert so much pressure that they tend to break open the seam and to fall out.

The present invention overcomes this problem by providing a seed tape closed by and sealed with an overlap so that the seed is not merely held together by the welding together of the side edges of the tape, but also by the overlap; thus, even though the seam itself may not be perfectly sealed, it is difficult for the seeds to fall out. Also, it becomes easier to make a better seam. The product is thus superior to other seed tapes, especially when large seeds are used. The invention provides not only a superior product, but method and apparatus for making it.

It is important for seed tape to be manufactured quite rapidly in order to be economical, and the present invention enables rapid manufacture of seed tape having an overlapping seam.

Other objects and advantages of the invention will appear from the preferred embodiment described in detail below.

In the drawings:

FIG. 1 is a fragmentary top plan view of a seed tape embodying the principles of the invention.

FIG. 2 is a view in section taken along the line 2—2 in FIG. 1.

FIG. 3 is a fragmentary view in side elevation of a portion of a seed tape manufacturing machine embodying the principles of the present invention.

FIG. 5 is an enlarged view taken in section along the line 5—5 in FIG. 4, looking at one end of the mandrel with its V-shaped grove.

FIG. 6 is an enlarged view in section taken along the line 6—6 in FIG. 4, looking at the other end of the mandrel.

FIG. 7 is an enlarged view in side elevation and in section of the mandrel, along the line 7—7 in FIG. 4.

FIG. 8 is an enlarged view in section taken along the line 8—8 in FIG. 4.

FIG. 9 is an enlarged view in section taken along the line 9—9 in FIG. 4.

FIG. 10 is an enlarged top plan view of the tape during manufacture according to this invention showing how the tape is overlapped and its progress in closing and flattening.

Figure 4:
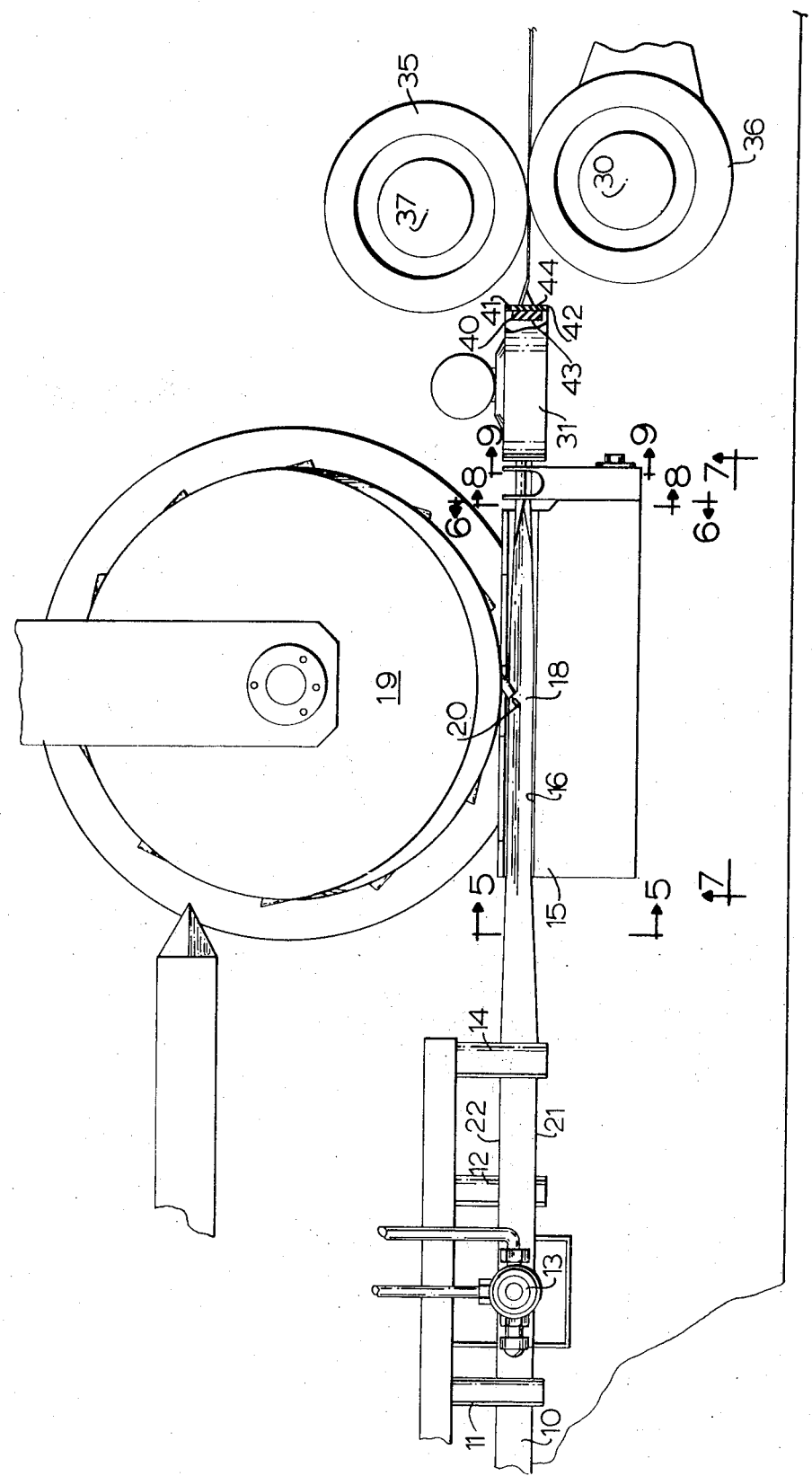
FIG. 4 is a top plan view of the apparatus of FIG. 1.

A continuous strip 10 of polyoxyethylene tape or other suitable material (from a suitable supply, as a reel or spool) enters from the left of FIGS. 3 and 4 as a flat tape passing under a flat cylindrical pin 11, over a flat cylindrical pin 12, and, in between the pins 11 and 12, beneath a moisture applicator 13, which sprays a desired pattern of moisture, along the edges only or along only one edge or over one entire face. The moistened tape 10 then passes over the pin 12 and under a pin 14, which guides it on to a mandrel member 15. The mandrel member 15 is preferably provided with a generally V-shaped slot 16 having a rounded bottom portion 17, shown greatly enlarged in FIG. 5. The tape 10 is constrained to follow this shape by virtue of the tension exerted on it by its guide pins an drive rollers. While the tape 10 is on the mandrel 15, it passes a seed depositing station 18. A seed placement machine 19 like that shown in U. S. patent application Ser. No. 721,542 filed Mar. 20, 1968, may be used, or one like that shown in U. S. Pat. application Ser. No. 710,014 filed Mar. 4, 1968, may instead be used.

In any event, seeds 20 are deposited one group at a time, sometimes in pluralities but usually one seed at a time, on the tape 10 while the tape 10 is approximately over the longitudinal center of the mandrel 15. Heretofore, the next step would have been to force the two side edges 21 and 22 of the tape 10 together to provide a seam, but in the present invention an overlap 23 is achieved by sending the tape 10 with its seed 20 through a first eye 25, which is generally circular, but is provided with a short step 26 near its uppermost portion. As a result, one side edge 22 is held along a larger radius than the other edge 21, as shown in FIG. 8, so that the edge 21 of the tape 10 is forced under the edge 22 to provide a short overlap 23. This eye 25 is carefully aligned relatively to the V-shaped groove 16 of the mandrel 15 and is located directly at its end.

Next, the tape 10 passes through a second eye 27 which is shaped substantially like the first eye 25, but is somewhat smaller in diameter; again there is a step 28, and this eye 27 increases the amount of the overlap 23. From here, the rounded and overlapped tape 10 passes, in as short a distance as possible, between two rollers 30 and 31 which are positioned on horizontal axes 32 and 33 to engage the tape 10 at a meeting point 34 and to flatten it, thereby forcing the moistened portions of the tape 10 to engage other portions of the tape and to seal along the overlap 23. The second eye 27 and the short distance between it and the rollers 30 and 31 counteract the tendency of the tape 10 to loosen and resume its original shape, and the tape 10 is able only to loosen to about the extent of the dimensions of overlap set in the first eye 25. The flattening by the rollers 30 and 31 retains the amount of overlap set by the eye 25, as shown in FIG. 8. From the point 34, the tape passes between a pair of final closing rollers 35 and 36 which exert somewhat more pressure. These rollers 35 and 36 are preferably mounted on vertical axes 37 and 38 and the tape is preferably turned 90° between the two sets of rollers.

The rollers 30, 31, 35 and 36 are preferably made with an indentation 40 lying between two shoulders 41 and 42. Within the indentation 40, is provided a soft rubber backing member 43 and on top of the shoulders 41 and 42 is an elastomeric ring 44, preferably or rubberband stock, to provide a soft seat for closing against the seeds 20 without damaging them.

An important feature of the invention, not mentioned heretofore, is that the bottom 17 of the groove or slot 16 is not precisely horizontal across the full length of the mandrel 15. Instead, it is horizontal for its first half and then, from about its midpoint at the seed-depositing station 18 it gradually drops, along an inclined path 50, which diverges at a relatively flat angle from the horizontal, shown by a broken line 51 in FIG. 7. At the same time, as may be seen by comparing FIG.

6 with FIG. 5, the bottom portion 52 only of the slot 16 is widened and rounded. We have found that this inclination and rounding of the bottom portion 52 both enables better and smoother introduction to the first eye 25 (so that the tape 10 hugs the walls of the eye 25 rather than bridging across chords and introducing defects in the final tape) and prevents carry-back of the encirclement by the tape to the seed-depositing station 18 where it would cause trouble. The eyes 25 and 27 are mounted for ready adjustment relative to the mandrel 15, to accommodate differences in tape thickness and so on.

To summarize, the flat tape 10 is first formed into a V-shape, the seed 20 is deposited, the tape 10 is then formed into a circle with an overlap 23, and then the circle is flattened out with the seed 20 remaining in the center of the flattened-out portion and the overlap 23 thereby retained; then the tape is forced with somewhat more pressure to full closure at the seams along the overlap 23.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. Apparatus for manufacturing seed tape from a flat strip comprising,
    a mandrel with a generally V-shaped groove having a rounded bottom portion,
    means for exerting lengthwise tension on said strip so as to cause it to travel over the mandrel and to become a generally V-shaped trough,
    means for depositing seeds at desired intervals at a desired location in the V-shaped trough in between its ends,
    a circular eye at the far end of the V-shaped trough, having a generally circular opening that has a gradually enlarged periphery terminating near the top at a step, so as to cause the strip to form an overlap, and
    closing means for flattening the circular tape horizontally with the seed centered in the tape and the overlap centered above it.

2. The apparatus of claim 1 having moistening means preceding the mandrel, so that the tape is moistened there and, when flattened is sealed, the tape used being of the type that is made tacky when moistened.

3. The apparatus of claim 1 having a second circular eye between the named said eye and said closing means, said second eye having a slightly smaller opening causing the strip to assume slightly more overlap.

4. The apparatus of claim 1 wherein said mandrel has its bottom edge gradually deepened and increasingly rounded between the means for depositing and said eye.

5. Apparatus for manufacturing seed tape from a flat strip of polyoxyethylene comprising,
    a mandrel with a generally V-shaped groove having a rounded bottom portion,
    means for exerting lengthwise tension on said strip so as to cause it to travel over the mandrel and to accept the generally V-shape,
    dispensing means for depositing seeds on said strip at desired intervals at a depositing station lying at substantially the longitudinal center of the V-shaped mandrel,
    moistening means preceding one end of said mandrel, for moistening a portion of said strip,
    a first circular eye adjacent the other end of the mandrel having a generally circular opening with a gradually spiraling periphery terminating near the top at a step, so as to cause the tape to form an overlap,
    said mandrel having its groove gradually deepened and its bottom portion increasingly rounded between said dispensing means and said first eye,
    a second circular eye having an opening like that of said first eye but smaller, to provide the strip with a greater overlap, and
    means for flattening the circular tape horizontally with the seed centered in the tape and the overlap centered above it, thereby causing the moistened portion to adhere to another portion and seal the tape at said overlap.

* * * * *